Jan. 28, 1964     R. FARRO     3,119,386
ACCESSORY DEVICE FOR OUTDOOR COOKING APPARATUS
Filed Oct. 11, 1960
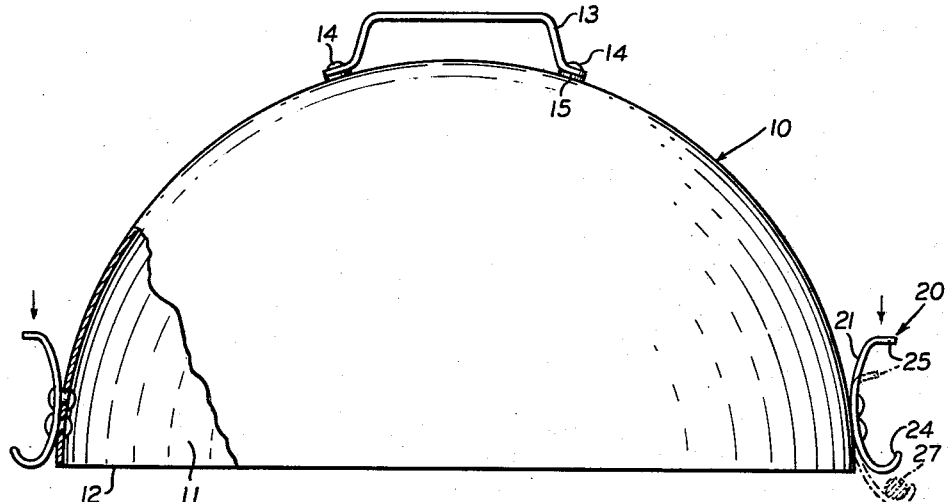
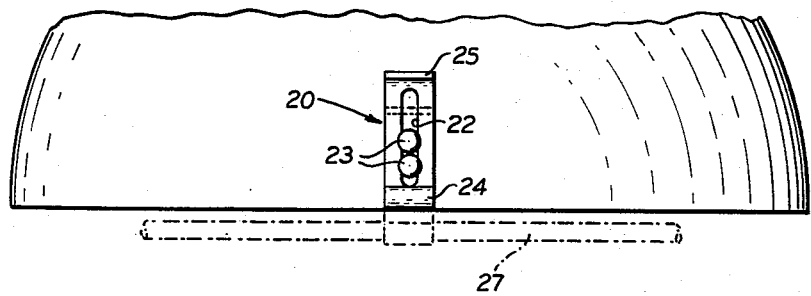
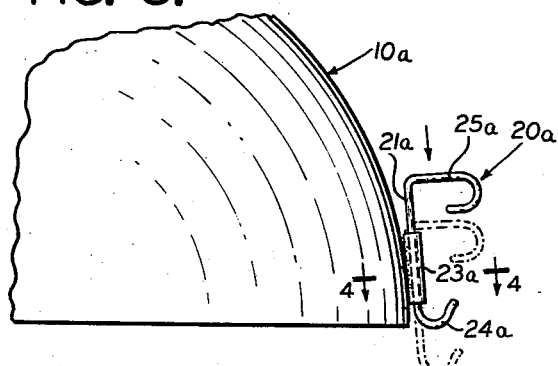
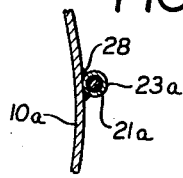
INVENTOR
RUBEN FARRO
BY
ATTORNEYS.

United States Patent Office 3,119,386
Patented Jan. 28, 1964

3,119,386
ACCESSORY DEVICE FOR OUTDOOR COOKING APPARATUS
Ruben Farro, 554 Alda Road, Mamaroneck, N.Y.
Filed Oct. 11, 1960, Ser. No. 62,000
3 Claims. (Cl. 126—25)

This invention relates generally to devices for use in cooking, and is especially concerned with a unique improvement for use in conjunction with outdoor cooking apparatus.

As is well known, outdoor cooking as now commonly practiced involves the use of an openwork gridiron or grill adapted to rest in a container spaced over burning charcoal, or the like. Considerable difficulty is experienced in attempting to handle the hot grill, as in removal for cleaning, say of the grill itself or of the charcoal receptacle. Further, extinguishment of the fire and removal of the ashes and remaining charcoal presents additional difficulties and requires extreme care. Also, conventional extinguishment of the fire, either by dousing or waiting for the fire to burn out, results in considerable waste of charcoal or briquettes.

Accordingly, it is an object of the present invention to provide an accessory device for outdoor cooking apparatus which overcomes the above-mentioned difficulties, enables the hot grill or gridiron to be simply and easily removed without likelihood of injury, and also enables the fire to be quickly and easily snuffed out when no longer required, to permit recovery of unburned charcoal or briquettes.

It is another object of the present invention to provide outdoor cooking apparatus having the advantageous characteristics mentioned in the preceding paragraphs which more efficiently retains and concentrates heat to produce improved cooked products in shorter time, and which is entirely safe and reliable throughout a long useful life.

It is still a further object of the present invention to provide a device of the type described which is extremely simple in construction, durable and long-lasting in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

In the drawings:

FIG. 1 is an elevational view showing a device constructed in accordance with the teachings of the present invention, partly broken away for clarity of illustration, and showing an element thereof in dot-and-dash outline in an alternate condition of use;

FIG. 2 is a partial elevational view of the device of FIG. 1, taken from the right side thereof;

FIG. 3 is a partial elevational view showing a slightly modified device constructed in accordance with the instant invention; and FIG. 4 is a partial sectional view taken substantially along the line 4—4 of FIG. 3.

Referring now more particularly to the drawings, and specifically to FIGS. 1 and 2 thereof, a cover element is there generally designated 10, and may assume the illustrated configuration of a generally semispherical shell having a concave interior 11 facing downward. In operative association with outdoor cooking apparatus, the shell or cover element 10 is arranged in downwardly facing relation, with its lower edge 12 resting on an openwork gridiron or grill. That is, the cover element or shell 10 is arranged on a grill, over the fire and enclosing the food being cooked.

Suitable handgrip means, such as a handle 13 may be provided exteriorly on the cover element 10, say at the uppermost region thereof. The illustrated handle 13 includes an inverted, generally U-shaped elongate element having its opposite ends secured fast to the cover 10, as by fasteners 14, which may be provided with insulating washers 15 interposed between the handle and cover element, if desired.

Carried exteriorly on the cover element 10, on the lower region thereof, may be detachable-connection mechanisms, generally designated 20. Preferably at least two such detachable-connection mechanisms are employed, and may be located at diametrically opposed regions on the cover element, as illustrated herein.

Each detachable-connection mechanism 20 includes an elongate, generally vertical element or strip 21 bent in an arcuate configuration having its concave side facing radially outward away from the cover element. The elongate-strip elements 21 are each formed with a longitudinally extending slot 22, see FIG. 2, which may receive a pair of headed fasteners 23 extending generally radially of the cover element and arranged in side-by-side, vertically aligned relation. Thus, the headed fasteners 23, extending through the slot 22, serve to mount the elongate element 21 on the cover element 10 and guide the elongate element for generally vertical movement within the limits of the longitudinal slot.

The strip of each elongate element 21 is preferably of resiliently deflectable material, and has its lower region bent outward and upward to define a hook member 24. The upper-end region of the elongate element 21 may be bent to extend laterally outward and provide a finger piece or grasping element 25.

As thus mounted, the elongate element 21, together with its lower-end hook member and upper-end finger piece 25 are shiftable vertically between an upper, retracted position, such as shown in solid lines, and a lower, extended position, as shown in dot-and-dash outline. In the lower, extended position, the elongate element 21 and its lower-end hook member 24 depend below the lower edge 12 of the cover element 10, and in this condition the hook member is adapted to engage beneath an adjacent portion 27 of a grill. Thus, with both the connection mechanisms 20 engaged with the respective adjacent grill portions, it is apparent that the cover element 10 is effectively secured to the nether grill. In this condition, cooking may proceed and the food is protectively enclosed within the cover element, as well as heat being concentrated, reflected and retained therewithin for more uniform, thorough and quicker cooking, even of frozen foods.

The cover element 10 may be readily removed from the grill by mere upward withdrawal of the elongate elements 21, whereupon the hook members 24 are resiliently deflected and released from engagement with the grill. The cover element 10 is then free for removal, to expose the cooked food.

If it is desired to remove a hot grill from the fire, the cover element 10 may be replaced on the grill and the connection means 20 engaged with the adjacent grill portions, whereupon the grill may be removed from the fire by mere handling of the cover element.

Should it be desired to quickly and completely snuff out burning charcoal or the like, the cover element 10 may be replaced within the charcoal container in the absence of a grill, directly over the charcoal to exclude oxygen and quickly extinguish the fire.

In the embodiment of FIGS. 3 and 4, a cover element 10a is provided with detachable-connection means 20a.

The connection means 20a includes a generally vertical, elongate element 21a, which may be fabricated of wire or rod stock and is secured to the cover element by a generally vertically disposed guide member or tube 23a slidably and rotatably receiving the elongate element. Welds 28, or other suitable means may be employed to fasten the guide member or tube 23a to the lower exterior region of the cover element 19a. The lower end of the elongate element 21a, below the guide member or tube 23a is bent upward to define a hook member 24a, while the upper end of the elongate element may be bent laterally to provide a finger piece or gripping portion 25a.

The detachable connection means 25a is similar in operation to the first-described detachable-connection means 25, and in addition may be rotated about the generally vertical axis of guide tube 23a to further facilitate engagement and disengagement from an adjacent portion of a nether grill.

From the foregoing, it is seen that the present invention provides an accessory device for outdoor cooking apparatus which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. Accessory means for a handled dome-like cover element for an openwork grill to provide for the cover element to serve selectively as the carrier for the grill; said accessory means comprising at least a pair of fastener components; each fastener component including mounting means slidably interengaged with an elongated element for relative sliding of said element longitudinally of its length; said mounting means being adapted to be secured to the cover element adjacent the lower edge thereof in circumferentially spaced relation to each other with an orientation on the cover element for generally vertical sliding movement of the associated elongated elements between lower extended positions wherein the lower ends of the associated elongated elements are adapted to extend below the lower edge of the cover element and upper retracted positions wherein the lower ends of the associated elongated elements are positioned not lower than the lower edge of the cover element; each elongated element having a lower and upper end projecting substantially normal to the path of sliding movement of the elongated element to form, respectively, a lower hook and an upper grip for manual actuation of the elongated element; said hooks being adapted to clear the grill when said elongated elements are in their retracted positions, and said hooks, when said elongated elements are in said lower extended positions, being adapted to extend through openings of the grill for hooking under portions of the grill for transport of the grill by the handled cover element; said mounting means limiting movement of said elongated elements to said two positions thereof.

2. Accessory means as claimed in claim 1 in which each elongated element and its hook ends is integrally fabricated of an elongated resilient strip; the associated mounting means extending through an elongated slot extending longitudinally of the strip.

3. Accessory means, as claimed in claim 1, each elongated element and its hook ends being integrally fabricated of a wire; the associated mounting means comprising an elongated sleeve slidably receiving the portion of said wire intermediate said hook ends.

References Cited in the file of this patent

UNITED STATES PATENTS

| 128,238 | Moran | June 25, 1872 |
| 397,869 | Munson | Feb. 12, 1889 |
| 1,169,831 | Jeavons | Feb. 1, 1916 |
| 1,452,558 | Jackson | Apr. 24, 1923 |
| 1,622,494 | Cranston | Mar. 29, 1927 |
| 2,358,607 | Tinnerman | Sept. 19, 1944 |
| 2,573,988 | Saltzberg | Nov. 6, 1951 |

FOREIGN PATENTS

| 194,195 | Great Britain | Mar. 8, 1923 |